C. L. KAUFMAN.
ANIMAL TRAP.
APPLICATION FILED NOV. 10, 1909.
990,141.
Patented Apr. 18, 1911.
2 SHEETS—SHEET 2.
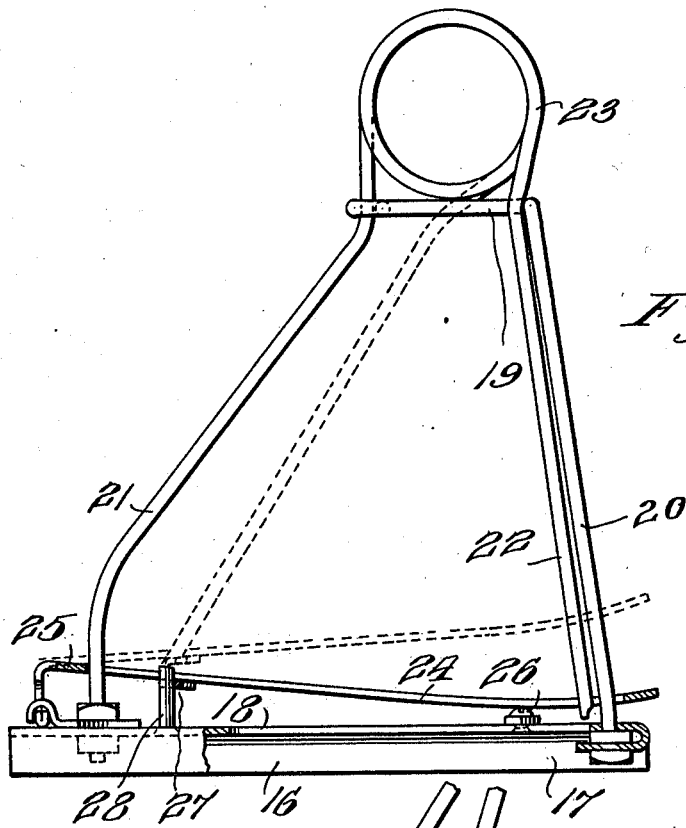
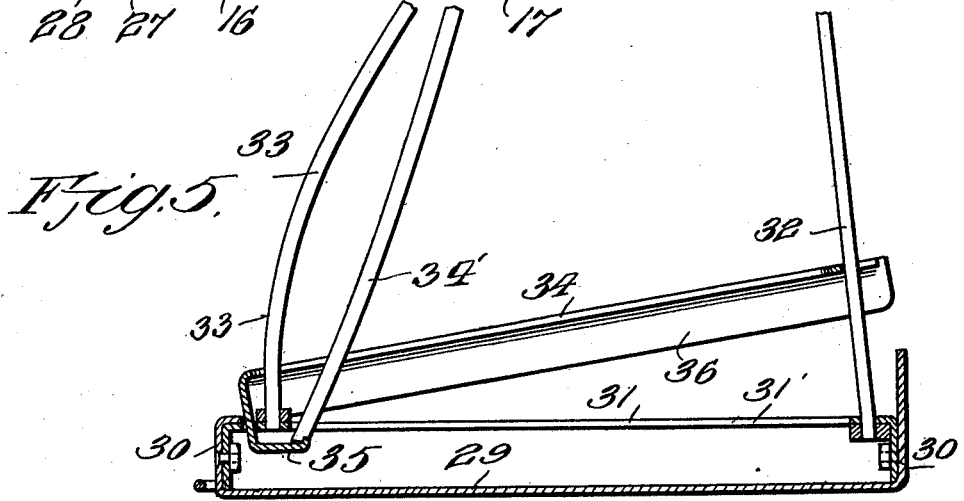

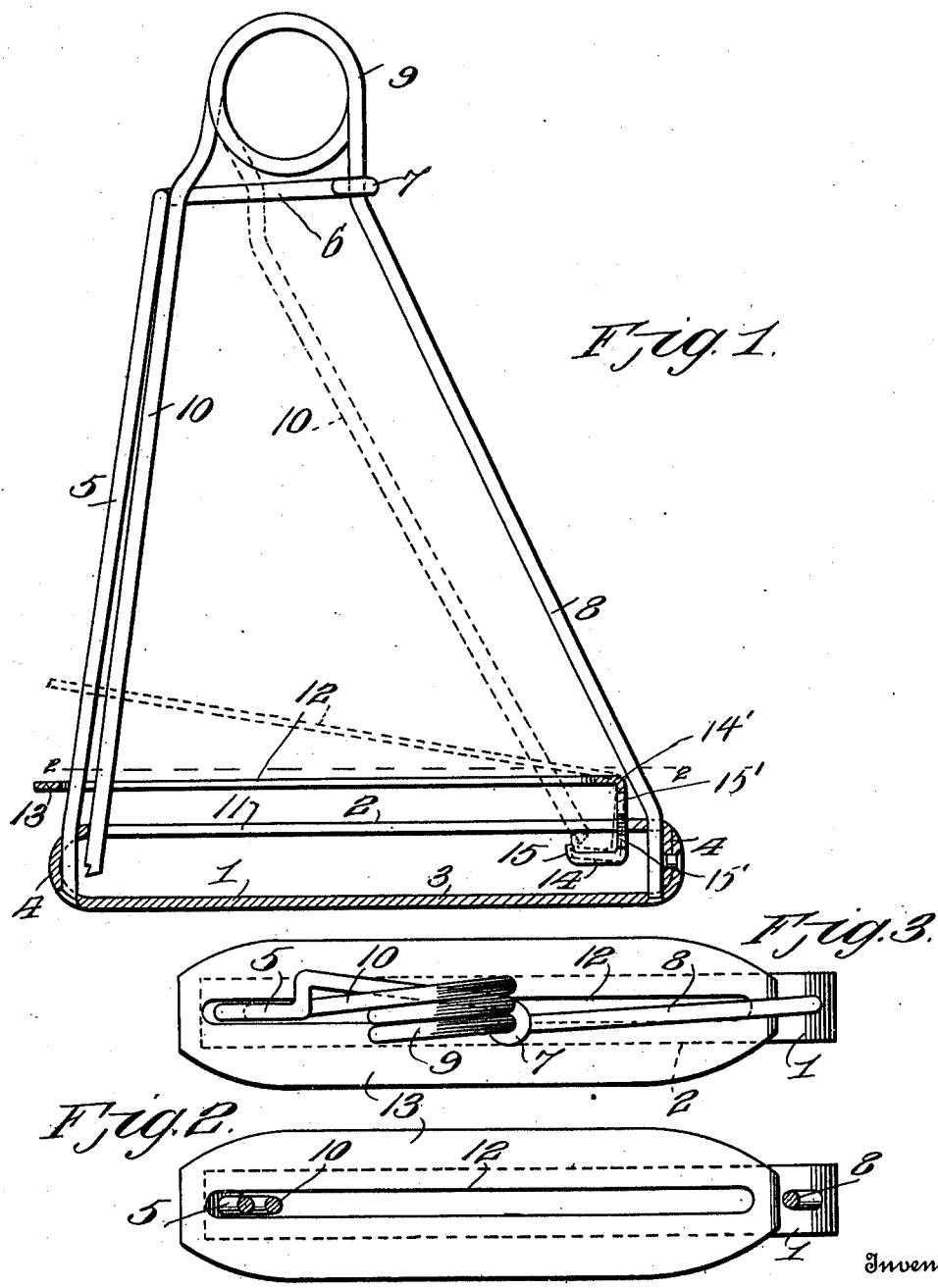

UNITED STATES PATENT OFFICE.

CHARLES L. KAUFMAN, OF HIGHLAND LAKE, MAINE.

ANIMAL-TRAP.

990,141.  Specification of Letters Patent.  Patented Apr. 18, 1911.

Application filed November 10, 1909. Serial No. 527,242.

*To all whom it may concern:*

Be it known that I, CHARLES L. KAUFMAN, a citizen of the United States, residing at Highland Lake, in the county of Cumberland and State of Maine, have invented new and useful Improvements in Animal-Traps, of which the following is a specification.

This invention relates to animal traps, and has for an object to provide a device of this character that can be manufactured chiefly from a piece of strong and resilient wire, thus reducing the cost of its manufacture to a minimum.

The above mentioned and other objects are attained by the construction, combinations and arrangements of parts, as disclosed on the drawings, set forth in this specification, and particularly pointed out in the appended claim.

In the drawings, forming a portion of this specification and in which like numerals of reference indicate similar parts in the several views:—Figure 1 is a sectional elevation of my improved trap. Fig. 2 is a horizontal section taken on the line 2—2 of Fig. 1. Fig. 3 is a top plan view. Fig. 4 is a view similar to Fig. 1 showing a slightly modified form of my invention. Fig. 5 is a similar view of a still further modified form.

My improved trap consists of a base 1 which is preferably of yoke form and is constructed from a single piece of sheet metal bent to form longitudinally extending bars 2 and 3 and connecting end portions 4. The said base member has secured thereto at one end an arm 5 of a member 6. The arm 5 of the said member is bent at its upper end in a plane parallel with the base 1 and has its extremity bent to form an eye 7 which surrounds the arm 8. The last named arm has its lower end secured to the other end of the base 1 and at the upper end the said arm is provided with a coiled portion 9 from one winding of which extends a jaw 10. The arm 5 of the said member 6 forms the fixed jaw and the arm 10 the movable jaw. The lower end of the jaw 10 extends through and is movable in slots 11 and 12 formed in the bar 2 of the base 1 and in a platform 13. This platform is pivoted at one of its ends to the bar 2 of the base 1 and as illustrated, the said platform is formed with a trigger 14 which is located or disposed between the said bars 2 and 3 of the base.

In operation, when it is desired to set the trap the platform 13 is moved outwardly so that its trigger will be located in the path of movement of the movable jaw 10. The said movable jaw has formed therein adjacent to its lower end a depression in which the hooked end 15 of the trigger is adapted to be seated. When the movable jaw 10 has been operatively engaged with the trigger as just described it will be seen that it is moved against the tension of the coil 9. When an animal comes in contact with the platform and depresses it or moves the same toward the bar 2 of the base 1 the trigger will be moved out of engagement with the said movable jaw freeing the same and allowing it to move with great rapidity toward the fixed jaw 5.

In the form of my invention shown in Fig. 4, the base 16 is formed from a piece of sheet metal whose longitudinal edges are bent to form depending walls 17. The said base is slotted longitudinally as shown at 18 for a purpose to be hereinafter described. The member 19 in this form of my invention is identical with the one described in the preferred form but briefly the said member will be described as being provided with a fixed jaw 20 whose lower extremity is secured to the said base. The arm 21 has its lower extremity secured to the opposite end of the said base. The movable jaw 22 which extends from one of the windings of the coil 23 is adapted for movement in the longitudinal slot 18 in the base. This movable jaw is also adapted for movement in the longitudinal slot 24 in the platform 25. The platform 25 in this form of my invention is curved longitudinally throughout its length and is adapted when the trap is in its unset position to rest upon lugs 26 which extend from the base. This construction is provided for the purpose of allowing the operator to conveniently manipulate the platform. The platform is provided with a trigger 27 which spans the slot 24 of the platform and is located adjacent to a pin 28 which extends upwardly from the base. In this form of my invention when it is desired to set the trap the movable jaw 22 is moved longitudinally in the slots 18 and 24 and the lower extremity of the said movable jaw is positioned behind the trigger 27, the lower edge portion of the said movable jaw being yieldingly and frictionally engaged with the upper end of the pin 28. In this manner it will be seen that the said movable jaw is held against the tension of the coil 23. When the platform is depressed it will carry therewith the trigger, consequently freeing the movable jaw and allowing it to move with great rapidity toward the fixed jaw 20. The platform in the construction shown and described in Fig. 4 is pivoted at one end to the base of the trap, the other end of the said platform being free for vertical movement.

In the form shown in Fig. 5, the trap is adapted for heavier work and it comprises a base 29 which is formed from a piece of stout sheet metal whose ends are bent upwardly to form walls 30. A longitudinally extending plate 31 is secured at its ends to the walls of the base and as shown, the said plate is formed with a longitudinally extending slot 31'. This slot is provided for the purpose of receiving and guiding the movable jaw of the trap. The fixed jaw 32 and the arm 33 of the member 33' in this form of my invention are secured in any well known manner to the base of the device. A platform 34 is pivoted at one end to the plate 31 and this platform carries a trigger 35 which is similar to the trigger described in the preferred form of my invention. The platform 34 is formed at its ends with guide flanges 36 which are adapted to straddle the side edges of the plate 31. The lower end of the movable jaw 34' of this form of my invention is notched to sufficiently and effectively engage the trigger of the movable platform.

A trap as herein shown and described by me is extremely simple in construction and will be found most effective. It embodies means whereby the movable body of the trap can be set in an easy and simple manner without endangering the operator.

It is described herein that the platform 13 is pivotally mounted on the base 1, and as illustrated, such mounting is made through the provision on the shank 14' of the trigger of the lugs 15'. These lugs are spaced from each other and they extend across the slot 11 so as to provide for the required rocking movement of the platform and to prevent its accidental displacement from the base.

I claim:

An animal trap comprising a slotted base member, a member bent intermediate of its ends to form a coiled portion, the said member having one of its ends formed to provide an attaching arm which is secured to the base member and having its other end formed to provide a movable jaw, a fixed jaw supported by the base member and disposed in the path of movement of the movable jaw and having a portion secured to and embracing the arm of the said second named member, and a movable platform mounted on the base member and provided with means for engaging the movable jaw to hold the same normally in an open position.

In testimony whereof I affix my signature in presence of two witnesses.

CHARLES L. KAUFMAN.

Witnesses:
MELVILLE A. FLOYD,
E. A. TURNER.

---

Copies of this patent may be obtained for five cents each, by addressing the "Commissioner of Patents, Washington, D. C."